United States Patent [19]
Ishihara et al.

[11] Patent Number: 5,422,738
[45] Date of Patent: Jun. 6, 1995

[54] COLOR IMAGE FORMING METHOD AND AN APPARATUS EMPLOYED THEREFOR, AND A CORRECTION FACTOR DETERMINING METHOD

[75] Inventors: Hideshi Ishihara, Takatsuki; Haruo Yamashita, Osaka; Yasuki Matsumoto, Hirakata, all of Japan

[73] Assignee: Matsushita Electric Industrial Co., Ltd., Osaka, Japan

[21] Appl. No.: 229,053

[22] Filed: Apr. 18, 1994

Related U.S. Application Data

[63] Continuation of Ser. No. 855,717, Mar. 20, 1992, abandoned.

[51] Int. Cl.$^6$ .................................. G03F 3/08
[52] U.S. Cl. .................................. 358/500; 358/518; 358/523
[58] Field of Search ............... 358/500, 517, 518, 515, 358/523

[56] References Cited

U.S. PATENT DOCUMENTS

| | | | |
|---|---|---|---|
| 4,481,532 | 11/1984 | Clark | 358/80 |
| 4,584,601 | 4/1986 | Suzuki et al. | 358/80 |
| 4,614,967 | 9/1986 | Sayanagi | 358/75 |
| 4,636,844 | 1/1987 | Sasaki | 358/80 |
| 4,641,184 | 2/1987 | Alston | 358/75 |
| 4,789,892 | 12/1988 | Tsuzuki et al. | 358/75 |
| 4,796,085 | 1/1989 | Shinada | 358/75 |
| 5,315,381 | 5/1994 | Yamashita | 358/500 |

FOREIGN PATENT DOCUMENTS 62-72277  4/1987  Japan .

OTHER PUBLICATIONS

"Image processing . . . Reproduction" entitled Imaging Part 1.

*Primary Examiner*—Edward L. Coles, Sr.
*Assistant Examiner*—John Ning
*Attorney, Agent, or Firm*—Ratner & Prestia

[57] ABSTRACT

A color image forming method and an apparatus to be used for executing the method are provided which are capable of effecting more faithful color reproduction with respect to a target color, and also, a color correction factor determining method to be used in the above method and apparatus. The color image forming apparatus to which the color image forming method is applied is arranged to subject three primary color luminance signals (R, G, B) to linear matrix calculation by a luminance matrix device for conversion into second luminance signals (R', G', B') to correct deviation of wavelength of the spectral absorbing characteristic of the ink, and to subject each color of the second luminance signals (R', G', B') to complementary color conversion into three primary color density signals ($D_R$, $D_G$, $D_B$) by a complementary color converting device, and further, to subject the three primary color density signals ($D_R$, $D_G$, $D_B$) to color correcting calculation by a color correcting device for conversion into ink density signals (C, M, Y), so as to correct color turbidity due to the unnecessary component of the ink. Additionally, the correction factor determining method determines the luminance matrix factor used for the luminance matrix calculation and the color correction factor used for the color correcting calculation by minimizing conditions of a color difference to be perceived by man.

5 Claims, 9 Drawing Sheets

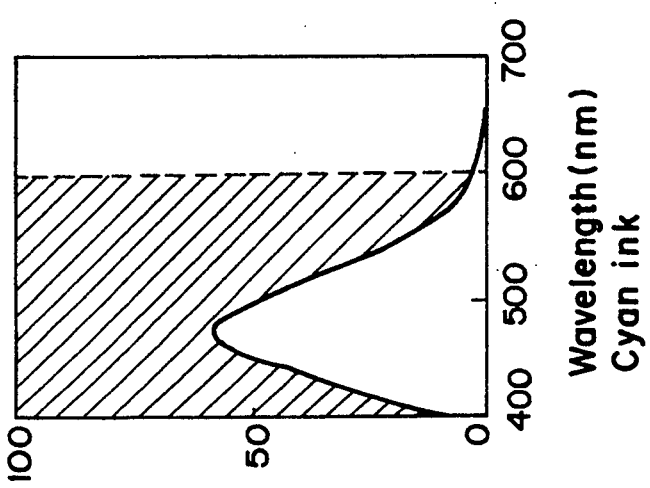
Fig.7(a) Yellow ink
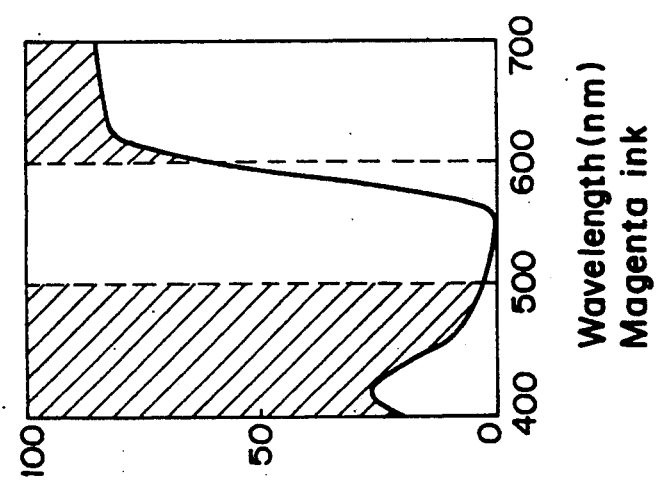
Fig.7(b) Magenta ink
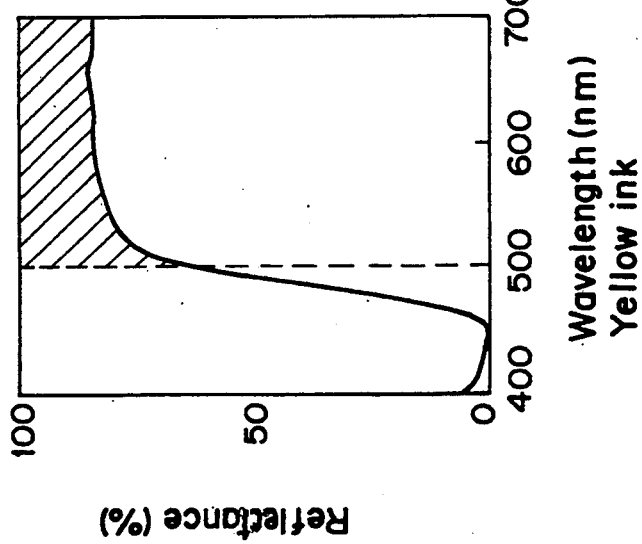
Fig.7(c) Cyan ink

COLOR IMAGE FORMING METHOD AND AN APPARATUS EMPLOYED THEREFOR, AND A CORRECTION FACTOR DETERMINING METHOD

This application is a continuation of application Ser. No. 07/855,717 filed Mar. 20, 1992, abandoned.

BACKGROUND OF THE INVENTION

The present invention generally relates to image formation, and more particularly, to a color image forming apparatus such as a color printer for printing out color images, color copying apparatus and the like, and especially, to a full color image forming apparatus capable of effecting favorable color reproduction.

In the color image forming apparatus such as a color printer, color copying apparatus or the like as referred to above, based on a principle of subtractive color mixture employing inks for cyan, magenta and yellow which are the complementary colors respectively of red, green, and blue of three primary colors for color light, it is an object for color reproduction to achieve colors equal to target colors for the respective color image forming apparatuses in a CRT (cathode ray tube), color original documents, etc.

However, inks actually available have a spectral characteristic which is too broad to act as an ideal absorbing filter with respect to respective color lights. By way of example, the spectral absorbing characteristics of the subliming dye generally employed are shown in FIGS. 7(a) to 7(c), from which it is seen that the spectral absorbing characteristics of the inks actually present or available are excessively broad, and as represented by hatched portions in FIGS. 7(a) to 7(c), there are present so-called unnecessary absorbing components which absorb even color lights having wavelengths to be normally transmitted completely, and thus, density different from that to be reproduced by each ink is reproduced during color mixing, thereby giving rise to color turbidity through reduction of chroma or saturation.

Additionally, in order to achieve the color equal to the target color, there is a problem related to deviation between the central wavelength of the spectral absorbing characteristic of the ink and the central wavelength of the spectral characteristic of the fluorescent material for the CRT (cathode ray tube-referred to as CRT hereinafter) or the central wavelength of the spectral characteristic of a color filter for a color scanner.

For example, the spectral characteristics for the fluorescent materials of a typical CRT are shown in FIG. 8, from which it is observed that the central wavelength of the spectral characteristic for the fluorescent material in each color is not in agreement with that of the spectral absorbing characteristic of the ink referred to earlier in FIG. 7. From the above fact, it will be understood that, even if the color turbidity due to the unnecessary absorbing component of the ink is prevented, if there is a deviation between the central wavelength of the spectral absorbing characteristic for the ink and the central wavelength of the spectral characteristic for each fluorescent material of the CRT or the central wavelength of the spectral characteristic of the color separation filter, hue of the color to be reproduced undesirably becomes different from the target color.

With respect to the problem as referred to above, a correcting method referred to as masking has conventionally been employed mainly with respect to the field of printing.

The practice most commonly employed is that called "linear masking" and represented by an equation (1) given below.

$$\begin{bmatrix} C \\ M \\ Y \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} D_R \\ D_G \\ D_B \end{bmatrix} \quad (1)$$

The linear masking is arranged to determine the ink density signals (C,M,Y) for controlling the density of inks to be employed, by the linear matrix calculation of three primary color density signals ($D_R$, $D_G$, $D_B$) which are complementary colors to the three primary color luminance signals (R,G,B) as represented by the above equation (1).

The linear masking is based on the assumption that, in the subtractive color mixture employing actual inks, the additive law of density (Lambert-Beer law) and proportional law may be established, but in the color reproduction employing the actual inks, there exist various non-linear factors such as re-subliming phenomenon of inks, internal reflection of inks, etc., for example, in the case of the subliming type thermal transfer recording system, and in the strict sense, the additive law and proportional law as referred to above can not be established.

Accordingly, a non-linear type higher order masking which determines the ink density signals (C,M,Y) by polynomials of higher order with respect to the three primary color density signals ($D_R$, $D_G$, $D_B$) has been proposed, among which the simplest quadratic masking equations are given below as equations (2).

$$C = a0 \cdot D_R + a1 \cdot D_G + a2 \cdot D_B + \\ a3 \cdot D_R^2 + a4 \cdot D_G^2 + a5 \cdot D_B^2 + \\ a6 \cdot D_R \cdot D_G + a7 \cdot D_G \cdot D_B + a8 \cdot D_B \cdot D_R \quad (2)$$

$$M = a9 \cdot D_R + a10 \cdot D_G + a11 \cdot D_B + \\ a12 \cdot D_R^2 + a13 \cdot D_G^2 + a14 \cdot D_B^2 + \\ a15 \cdot D_R \cdot D_G + a16 \cdot D_G \cdot D_B + a17 \cdot D_B \cdot D_R$$

$$Y = a18 \cdot D_R + a19 \cdot D_G + a20 \cdot D_B + \\ a21 \cdot D_R^2 + a22 \cdot D_G^2 + a23 \cdot D_B^2 + \\ a24 \cdot D_R \cdot D_G + a25 \cdot D_G \cdot D_B + a26 \cdot D_8 \cdot D_R$$

By the above representation, the non-linearity existing in the color reproduction employing the actual inks is approximated by the quadratic equations.

Meanwhile, there has also conventionally been proposed in Japanese Patent Laid-Open Publication Tokkaisho No. 62-72277, a method in which the spectral characteristic of a color separation system (scanner) for reading the original image is corrected by matrix calculation, and the signals thereof are subjected to complementary color conversion, with further application of the linear masking thereto, for conversion into ink density signals to obtain color hard copy.

The above method is arranged to subject the color image signals (R0,G0,B0) obtained by reading the original image, to the matrix calculation as shown in an equation (3) given below, and further, to complementary color conversion, and then, the linear masking is applied for conversion into the ink density signals ($D_C$,$D_M$,$D_Y$) so as to obtain the color hard copy.

$$\begin{bmatrix} DC \\ DM \\ DY \end{bmatrix} = \begin{bmatrix} a_{11} & a_{12} & a_{13} \\ a_{21} & a_{22} & a_{23} \\ a_{31} & a_{32} & a_{33} \end{bmatrix} \times \quad (3)$$

$$\left[ -\log \left[ \begin{bmatrix} S_{11} & S_{12} & S_{13} \\ S_{21} & S_{22} & S_{23} \\ S_{31} & S_{32} & S_{33} \end{bmatrix} \begin{bmatrix} R_\phi \\ G_\phi \\ B_\phi \end{bmatrix} \right] \right]$$

Subsequently, the conventional method of determining correction factors to be employed for the linear masking, non-linear higher order masking, etc. will be explained with reference to FIG. 9.

It is difficult to analytically determine nine correction factors $\{a\,k1\}$ ($k=1\sim3$, $1=1\sim3$) used for such linear masking, twenty-seven correction factors a0 to a26 adopted for the quadratic masking, and $\{a\,k1\}$ $\{S\,k1\}$ ($k=1\sim3, 1=1\sim3$) used for the equation (3), and they are conventionally determined by the method of least squares with respect to the density signals.

The method as referred to above will be more specifically explained with reference to FIG. 9, which shows a model for the color reproduction system employing such a method. In FIG. 9, X represents the density signal already known, and color chips are prepared by a recording system dealt with by the color modification (color correction) through employment of a sufficiently large number (n pieces) of X. The color chips thus prepared are subjected to color separation by a scanner (three color separating system), and the three primary color density signals D are obtained. When a transfer function of the above recording/reproducing system is represented by $\phi$, the color correction system is imparted with a reverse characteristic thereof, and a value $\phi^{-1}$ is determined so that the signal X" after passing through the color correction system and the original signal X are reduced to minimum on the average. In other words, the color correction factor is determined by the converging calculation employing the computer so as to minimize the errors related to the density signals between the density signal X used for the preparation of the color chips and the density signal X' for the output of the color modification system.

Such practice as above is described, for example, in an article "Image processing for color reproduction", a separate volume of a magazine "Shashin Kogyo" (Photographic Industry) entitled "Imaging Part 1".

However, in the conventional color correction techniques such as the linear masking, non-linear higher order masking, etc., it is intended to effect the correction by the calculation with respect to the density signals of subtractive color mixture, including color turbidity by the unnecessary absorbing component of the actual inks and the deviation in hue due to deviation between the central wavelength of the spectral absorbing characteristic of the ink and the central wavelength of the spectral characteristic of the fluorescent material for the CRT or the central wavelength of the spectral characteristic of a color filter for the color scanner.

Particularly, in the liner masking, the non-linearity factor as described earlier is also approximated by the linear calculation, and the correcting accuracy thereof is considered to be insufficient for the use in which color highly faithful color reproduction is required.

Moreover, the non-linear higher order masking is not intended to express the color reproduction of recording system analytically, but to approximate the non-linearity of the color reproduction through addition of the non-linear item and also, to effect the correction only by the calculation with respect to the density signals, and therefore, there is such a problem that the correcting accuracy thereof is still insufficient.

Meanwhile, in the method as disclosed in Japanese Patent Laid-Open Publication Tokkaisho No. 62-72277, it is so arranged to correct the spectral characteristic of the color separating system (scanner) by the matrix calculation for conversion into the density signals by the complementary color conversion, thereby to correct the spectral characteristic of the ink by the linear masking in the density signals. In other words, the correction with respect to the spectral characteristic of the ink is of the conventional linear masking, and therefore, the correcting accuracy was not sufficient, either.

On the other hand, the conventional correction factor determining method which minimizes the errors related to the density signals is superior in that the determination may be made by the converging calculation employing the computer. However, the correction factor as obtained by the conventional correction factor determining method is to effect the correction including not only the spectral absorbing characteristic of the ink, but also the spectral distribution characteristic of the color filter for the scanner (three color separation system), and thus, there is such a problem that the method can not be applied to the determination of the correction factor in the apparatus without any scanner, and as a video printer for printing out the color image to be outputted to the CRT, etc.

Moreover, the conventional correction factor determining method is intended to minimize the errors related to the density signals, with the density signals being set as evaluation values, and is not arranged to minimize the difference of colors perceived by man. From the above fact, there has been such a problem that the correction factor as determined by the conventional correction factor determining method is not most suitable from the viewpoint of color reproduction.

SUMMARY OF THE INVENTION

Accordingly, an essential object of the present invention is to be provide a color image forming method and an apparatus therefor, which are capable of effecting more faithful color reproduction with respect to the target color, and also, a color correction factor determining method which may minimize difference in colors to be perceived by man.

Another object of the present invention is to provide a color image forming apparatus which is simple in construction and stable in functioning and capable of executing said color image forming method in an efficient manner.

In accomplishing these and other objects, according to one preferred embodiment of the present invention, there is provided a method of forming a color image which comprises the steps of:

subjecting three primary color luminance signals (R,G,B) of additive color mixture to matrix conversion into second luminance signals (R', G', B'), subjecting each color of said second luminance signals (R', G', B') to complementary color conversion into three primary color density signals ($D_R$, $D_G$, $D_B$) of subtractive color mixture, subjecting each color of said three primary color density signals ($D_R$, $D_G$, $D_B$) to non-linear conversion into signals (C', M', Y') by first non-linear function of monotone increase, with derivative thereof being also of monotone increase, converting the signals (C', M', Y') into signals (C'',M'',Y'') by linear matrix calculation, and further subjecting said signals (C'',M'',Y'') to non-linear conversion into ink density signals (C,M,Y) to be used for recording by second non-linear function of monotone increase, with derivative thereof being of monotone decrease, which is of an inverse function of said first non-linear function, whereby the ink density is controlled according to said ink density signals (C,M,Y) for effecting color recording.

In another aspect of the present invention, there is also provided a method of determining correction factor including a luminance matrix factor to be employed in a luminance matrix calculation for converting three primary color luminance signals (R,G,B) into second luminance signals (R', G', B'), and a color correction factor to be employed in a color correcting calculation for converting three primary color density signals ($D_R$, $D_G$, $D_B$) into ink density signals (C,M,Y) to be used for recording, said method comprising:

a color chip signal generating step for generating n sets of ink density signals (Cj,Mj,Yj) (where j=1~n, n is a natural number), a color chip forming step for forming n sets of color chips by controlling ink density through employment of said ink density signal (Cj,Mj,Yj), a color measuring step for measuring color of said color chips, an inverse color correcting calculating step for converting the ink density signals (Cj,Mj,Yj) into the three primary color density signals ($D_{Rj}$,$D_{Cj}$,$D_{Bj}$) by an inverse color correcting calculation which is an inverse function of said color correcting calculation, an inverse complementary color converting step for effecting the inverse complementary color conversion with respect to each color of said three primary color density signals ($D_{Rj}$,$D_{Gj}$,$D_{Bj}$) for conversion into second luminance signals (R'j, G'j, B'j), an inverse luminance matrix calculating step for converting said second luminance signals (R'j, G'j, B'j) into the three primary color luminance signals (Rj,Gj,Bj) by inverse luminance matrix calculation which is an inverse function of said luminance matrix calculation, an evaluation value calculating step for calculating evaluation value through employment of the color measuring result of the color chips obtained by said color measuring step and the three primary color luminance signals (Rj,Gj,Bj) obtained by said inverse luminance matrix calculating step, a converging calculation step which judges whether or not the evaluation value which is the output of said evaluation calculating step is the minimum, and effects renewal of the inverse color correction factor to be used for the inverse color correcting calculation and the inverse matrix factor to be used for the inverse matrix calculation according to the result of said judgement, thereby to output the inverse color correction factor and the inverse luminance matrix factor for minimizing said evaluation value, and an inverse function calculating step for calculating the color correction factor and luminance matrix factor by calculating inverse functions of the inverse color correction factor for minimizing said evaluation value, the inverse color correcting calculation employing the inverse luminance matrix factor, and the inverse luminance matrix calculation respectively.

By the color image forming method according to the present invention as described above, deviation in the hue due to the deviation between the central wavelength of the spectral absorbing characteristic of the ink and the central wavelength of the spectral characteristic of the fluorescent material of the CRT or the central wavelength of the spectral characteristic of the color filter for the color scanner, is corrected by the linear luminance matrix calculation in the additive color mixture system, and the color turbidity by the unnecessary absorbing component of the ink is corrected by the color correcting calculation in the subtractive color mixture system respectively and independently.

Meanwhile, according to the color correction factor determining method of the present invention, it is adapted to obtain the factor for minimizing the color difference between the color signals calculated from the three primary color luminance signals obtained by applying the inverse color correcting calculation, inverse complementary color conversion, and inverse luminance matrix calculation to the ink density signal, and the result of color measurement of the color chips, and the respective factors are so determined as to cause the luminance matrix calculation and the color correction calculation to act as inverse functions of the inverse luminance matrix calculation and inverse color correcting calculation for minimizing the color difference.

BRIEF DESCRIPTION OF THE DRAWINGS

These and other objects and features of the present invention will become apparent from he following description taken in conjunction with the preferred embodiment thereof with reference to the accompanying drawings, in which;

FIGS. 7(a) to 7(c) are diagrams showing spectral absorbing characteristics of general subliming dyes (already referred to)

DETAILED DESCRIPTION OF THE INVENTION

Figure 1:
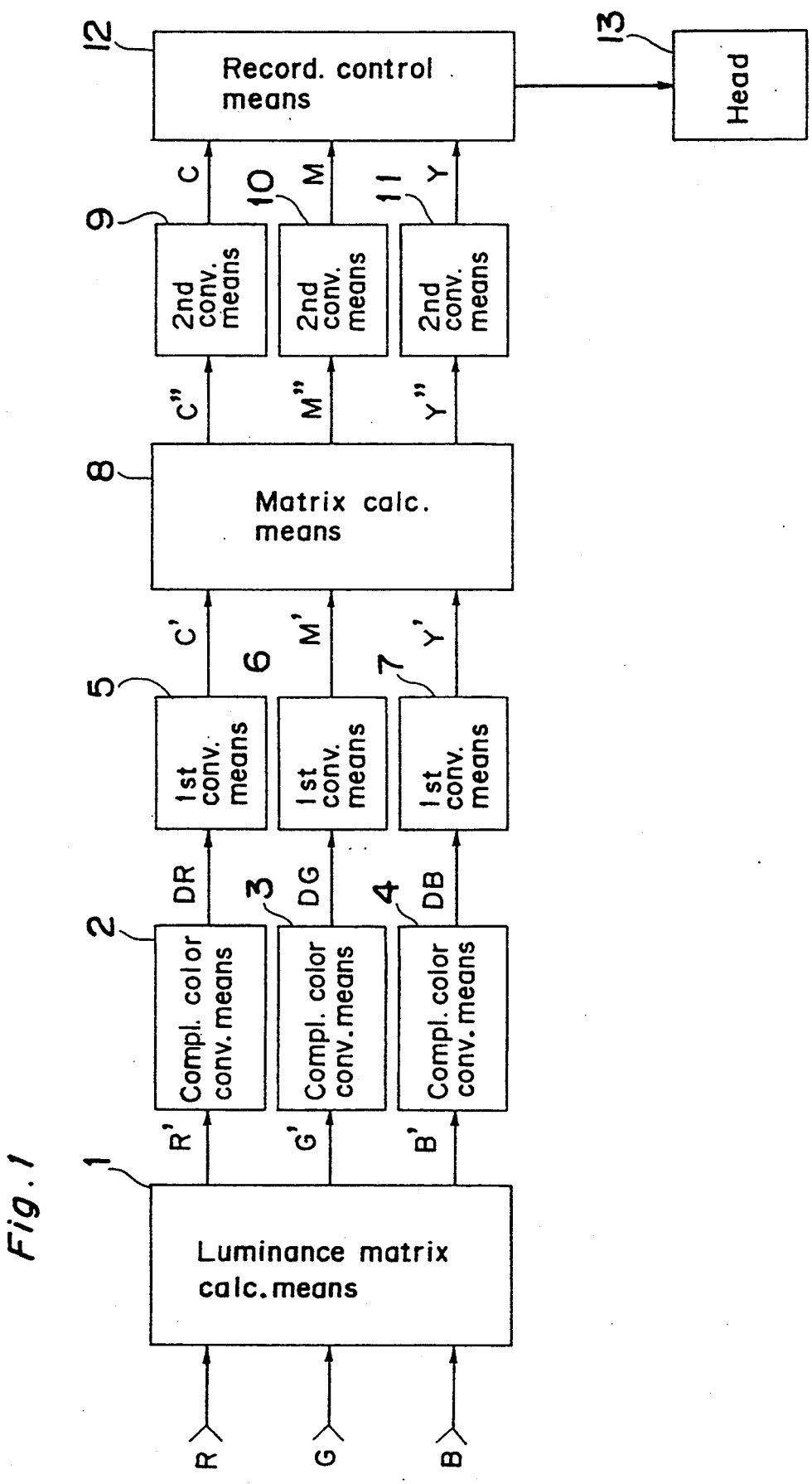
FIG. 1 is a schematic block diagram showing construction of a color image forming apparatus according to one preferred embodiment of the present invention.

Before the description of the present invention proceeds, it is to be noted that like parts are designated by like reference numerals throughout the accompanying drawings.

Firstly, one embodiment related to a color image forming apparatus according to the present invention will be described with respect to an example as applied to a video printer which is a full color printer of a subliming type thermal transfer system arranged to use three colors of inks for cyan, magenta and yellow for recording on an image receiving paper by a face order in the order of yellow, magenta and cyan, and intended to achieve color reproduction equal in color to the color image outputted by the cathode ray tube, through employment of the luminance signals applied to the cathode ray tube as input.

FIG. 1 shows a schematic block diagram of a color image forming apparatus according to a first embodiment of the present invention, which generally includes a luminance matrix calculating means 1 connected, through complementary color converting means 2,3 and 4, first converting means 5,6,7, a matrix calculating means 8, second converting means 9,10,11 and a recording control means 12, to a thermal head 13 as illustrated.

The luminance matrix calculating means 1 receives the three primary color luminance signals (R,G,B) of the picture elements to be recorded so as to effect the luminance matrix calculation of an equation (4) given below for outputting the second luminance signals (R', G', B') therefrom, which are respectively applied to the complementary color converting means 2,3 and 4 arranged to convert said luminance signals into the three primary color density signals ($D_R$, $D_G$, $D_B$) of the subtractive color mixture through complementary color conversion.

$$\begin{bmatrix} R' \\ G' \\ B' \end{bmatrix} = \begin{bmatrix} b_{11} & b_{12} & b_{13} \\ b_{21} & b_{22} & b_{23} \\ b_{31} & b_{32} & b_{33} \end{bmatrix} \begin{bmatrix} R \\ G \\ B \end{bmatrix} \quad (4)$$

The three primary color density signals ($D_R$, $D_G$, $D_B$) which are the outputs of the converting means 2,3, and 4 are applied to the first converting means 5,6 and 7 which convert the density signals ($D_R$, $D_G$, $D_B$) to (C', M', Y') by non-linear functions respectively of monotone increase, with derivative thereof being of monotone increase.

The matrix calculating means 8 is arranged to convert the outputs (C', M', Y') of the converting means 5,6 and 7 into signals (C'',M'',Y'') by the linear matrix calculation of an equation (5) below.

$$\begin{bmatrix} C'' \\ M'' \\ Y'' \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} C' \\ M' \\ Y' \end{bmatrix} \quad (5)$$

The second converting means 9,10 and 11 convert the outputs (C'',M'',Y'') of the matrix calculating means 8 into the ink density signals (C,M,Y) by non-linear functions of monotone increase, with derivative thereof being of monotone decrease.

The recording control means 12 is arranged to effect gradation color recording according to the ink density signals (C,M,Y) which are the outputs of the second non-linear converting means by controlling heat amount to be applied to the ink film (not shown).

Thus, the heat amount is controlled by the recording control means 12, with simultaneous control of the ink amount to be transferred from the ink film to the image receiving paper (not shown), and the recording is effected by the thermal head 13.

The luminance matrix calculating means 1 is arranged to correct deviation between a central wavelength of the spectral characteristic of a fluorescent material for the cathode ray tube (CRT) and that of the spectral absorbing characteristic of the ink, and executes the matrix calculation of the equation (4) based on the additive law and proportional law in the additive color mixture system.

Figure 2:
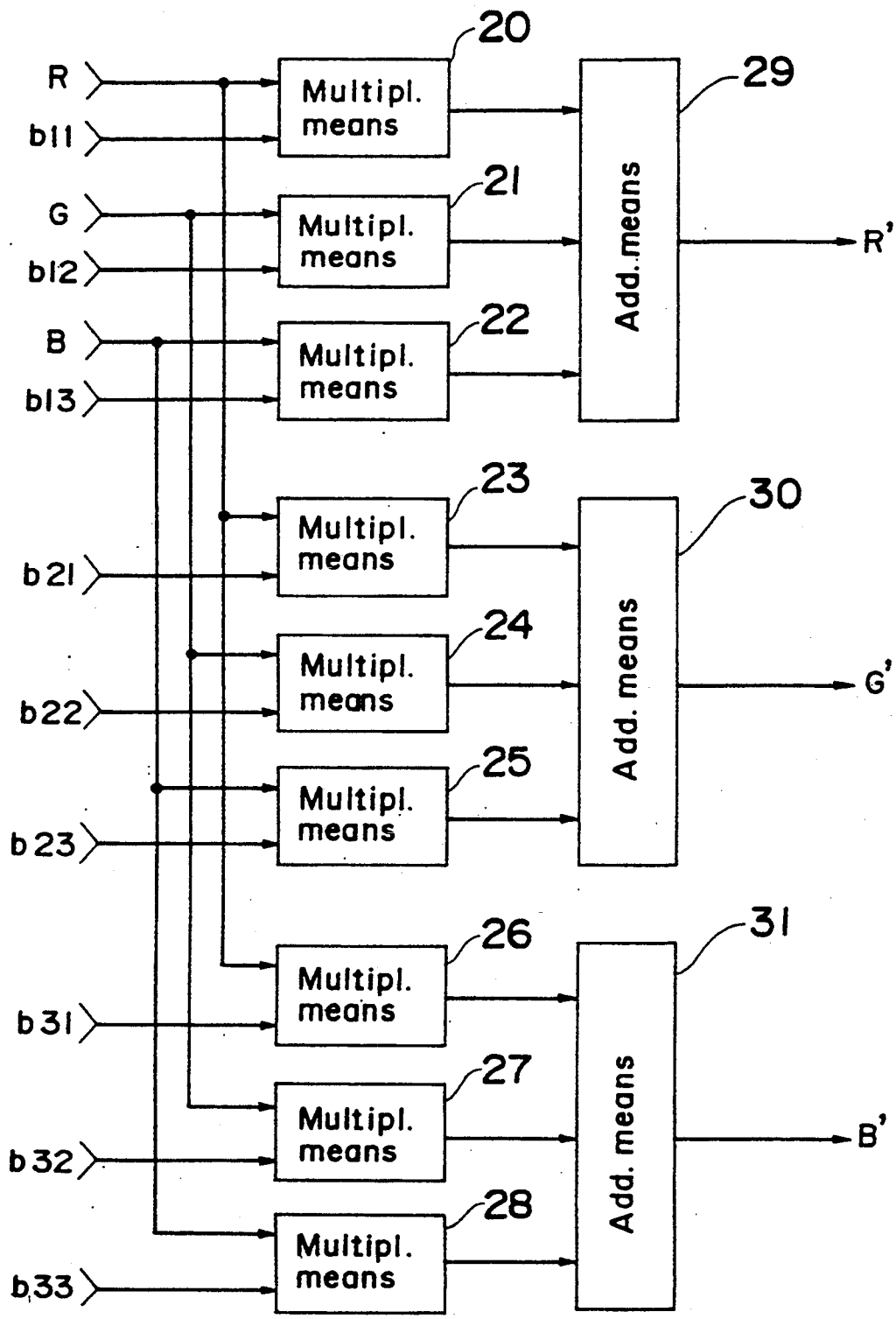
FIG. 2 is also a schematic block diagram showing construction of a luminance matrix calculating means.

FIG. 2 shows a specific construction of the luminance matrix calculating means 1 referred to above, which generally includes multiplying means 20 to 28, which effect multiplication with luminance matrix factors {b k1} (k=1~3, 1=1~3) for the three primary color luminance signals (R,G,B), and adding means 29,30, and 31 respectively calculate the sum of outputs of the multiplying means 20,21,22, sum of outputs of the multiplying means 23,24,25, and sum of outputs of the multiplying means 26,27,28 for producing results of calculations (R', G', B'), and are coupled with said multiplying means as illustrated.

The complementary color converting means 2,3 and 4 in FIG. 1 are intended to convert the luminance signals based on the additive color mixture principle into the density signals based on the subtractive color mixture principle. It is known that the density signals when the luminance signals are regarded as reflectance may be represented by equations (6) given below and in the present embodiment, there is employed a ROM in which the converting equations (6) are stored in the form of a table.

$$D_R = \log(1/R')$$

$$D_G = \log(1/G')$$

$$D_B = \log(1/B') \quad (6)$$

According to the present embodiment, the non-linear functions employed in the first converting means and the second converting means are respectively in the relation of inverse functions, and on the assumption that the factor representing the degree of non-linearity is denoted by a (a>1), the first converting means 5,6 and 7 respectively effect non-linear conversion represented by equations (7) below, $$C' = D_R^a$$

$$M' = D_G^a$$

$$Y' = D_B^a \quad (7)$$

While the second converting means 9,10 and 11 respectively effect non-linear conversion represented by equations (8) as follows.

$$C = C''^{1/a}$$

$$M = M''^{1/a}$$

$$Y = Y'^{1/a} \quad (8)$$

In the present embodiment, ROM in which the output and input of the equations (7) and (8) are preliminarily calculated and stored as table, are used both for the first and second converting means.

Subsequently, functions of the color image forming apparatus according to first embodiment as described so far will be explained.

Firstly, the function for effecting the recording of the first color, i.e. the recording of yellow will be explained hereinafter.

Upon input of the three primary color luminance signals (R,G,B) for the image to be reproduced into the color image forming apparatus of the present invention, the luminance matrix calculating means 1 effects the luminance matrix calculation represented by the equation (4), for conversion into the second luminance signals (R', G', B') corresponding to the central wavelength of the spectral absorbing characteristic of the ink.

Thereafter, the complementary color converting means 2,3 and 4 convert the second luminance signals (R', G', B') into the three primary color density signals ($D_R$, $D_G$, $D_B$) which are the respective complementary colors thereof.

Further, the first converting means 5,6 and 7 convert the three primary color density signals ($D_R$, $D_G$, $D_B$) into (C', M', Y') by the non-linear functions of the equations (7). The matrix calculating means 8 applies the linear matrix calculation with respect to (C', M', Y') for conversion into (C'',M'',Y''), while the second non-linear converting means 9,10, and 11 apply the non-linear calculation of the equations (8) with respect to (C'',M'',Y''), thereby to output the Yellow ink density signal Y.

According to the value of the ink density signal Y, the recording control means 12 controls the heat amount of the thermal head 13, thereby to effect the gradation recording on the image receiving paper sheet (not shown).

After effecting the above function with respect to recording one image face for yellow, similar functions are also effected for the inks of magenta and cyan. Thus, upon completion of the ink in three colors, the required full color image is formed on the image receiving paper sheet.

So far, the construction and function of the color image forming apparatus according to the first embodiment of the present invention have been explained.

In the present embodiment, although the complementary color converting means 2,3 and 4, and the first converting means 5,6, and 7 are constructed through employment of separate ROM, it may be so modified, for example, to store a table in which the complementary color conversion in the equations (6) and the non-linear conversion of the equations (7) are combined.

Hereinafter, as a second embodiment of the present invention, one example in which the luminance matrix factor {b k1} (k-1~3, 1=1~3) for the matrix calculation in the color image forming apparatus of the first embodiment, constant "a" to be used for the first non-linear function, and second non-linear function, and correction factor of the matrix factor {a k1} (k=1~3, 1=1~3) used for the matrix calculation are determined so that the color difference in an L*, u*, v* system uniform color space becomes the minimum, will be described.

Here, the inverse luminance matrix calculation is represented by an equation (9) given below, and the inverse matrix calculation is shown by an equation (10) also given below which is of an inverse function of the equation (5).

$$\begin{bmatrix} R \\ G \\ B \end{bmatrix} = \begin{bmatrix} b'_{11} & b'_{12} & b'_{13} \\ b'_{21} & b'_{22} & b'_{23} \\ b'_{31} & b'_{32} & b'_{33} \end{bmatrix} \begin{bmatrix} R' \\ G' \\ B' \end{bmatrix} \quad (9)$$

where $$\begin{bmatrix} b'_{11} & b'_{12} & b'_{13} \\ b'_{21} & b'_{22} & b'_{23} \\ b'_{31} & b'_{32} & b'_{33} \end{bmatrix} = \begin{bmatrix} b_{11} & b_{12} & b_{13} \\ b_{21} & b_{22} & b_{23} \\ b_{31} & b_{32} & b_{33} \end{bmatrix}^{-1}$$

$$\begin{bmatrix} C \\ M \\ Y \end{bmatrix} = \begin{bmatrix} a'_{11} & a'_{12} & a'_{13} \\ a'_{21} & a'_{22} & a'_{23} \\ a'_{31} & a'_{32} & a'_{33} \end{bmatrix} \begin{bmatrix} C'' \\ M'' \\ Y'' \end{bmatrix} \quad (10)$$

where $$\begin{bmatrix} a'_{11} & a'_{12} & a'_{13} \\ a'_{21} & a'_{22} & a'_{23} \\ a'_{31} & a'_{32} & a'_{33} \end{bmatrix} = \begin{bmatrix} a_{11} & a_{12} & a_{13} \\ a_{21} & a_{22} & a_{23} \\ a_{31} & a_{32} & a_{33} \end{bmatrix}^{-1}$$

Figure 3:
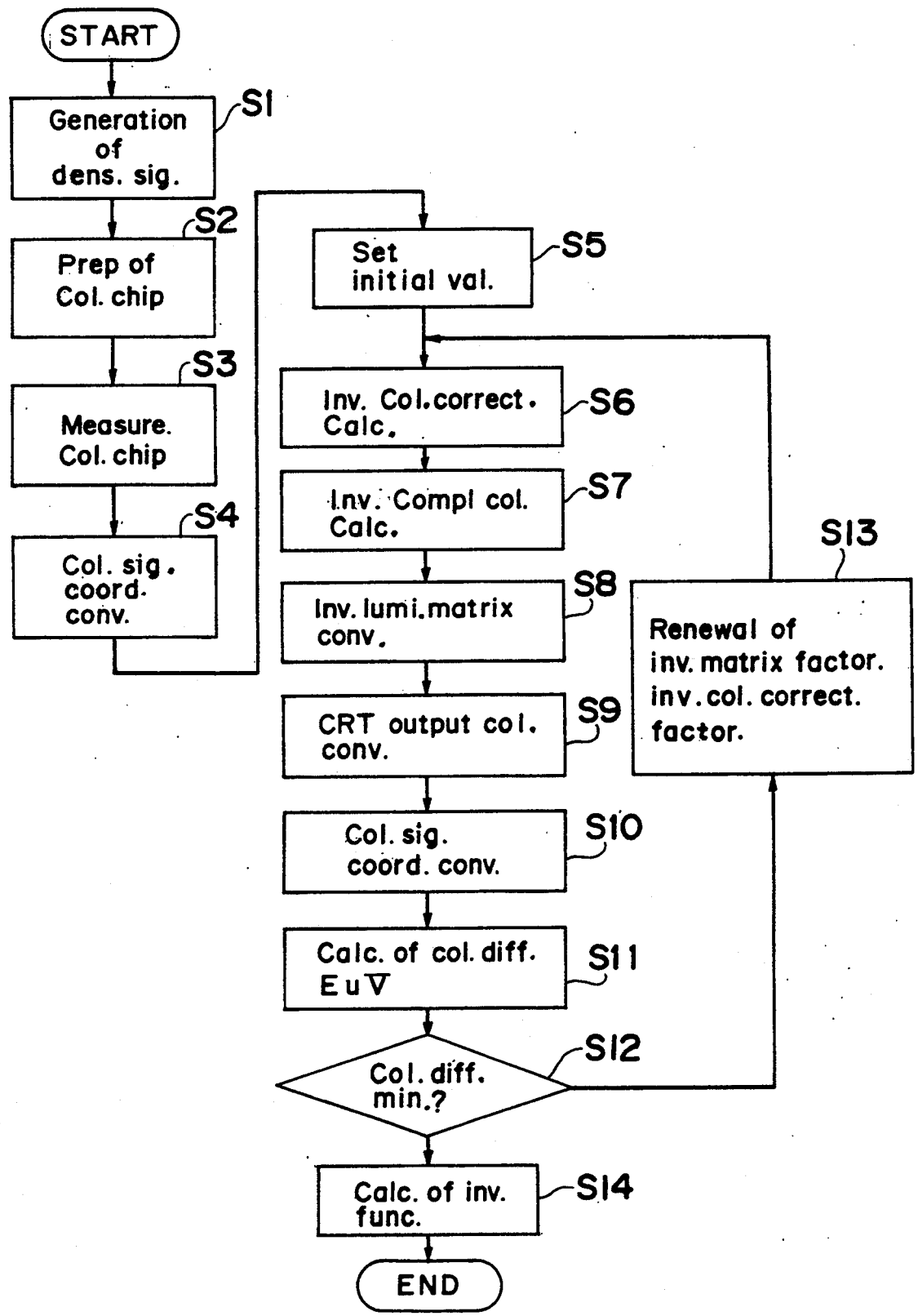
FIG. 3 is a flow-chart for determining the correction factor in the embodiment of the present invention.

Referring to a flow-chart of FIG. 3 representing steps for determining correction factors, determination of the luminance matrix factor {b k1}, constant "a" representing the degree of non-linearity, and the matrix factor {a k1} (k=1~3, 1−1~3) will be sequentially explained according to each step.

Firstly, in a color chip signal generating process at Step S1, n sets of ink density signals (Cj,Mj,Yj) (where j=1~n, and n is a natural number) are generated. Then, at a color chip forming process at Step S2, n sets of color chips are formed by controlling ink density of respective colors through employment of the ink density signals (Cj,Mj, and Yj). Thereafter, in a color measuring process at Step S3, color signals (X1j,Y1j,Z1j) are obtained by measuring the color chips prepared at step S2 by using a colorimeter. Thereafter, at step S4, through employment of equations (11), the color signals (X1j,Y1j,Z1j) are converted into co-ordinates (L*1j, u*1j, v*1j) of uniform color space. It is to be noted here that equations (11) given below are the converting equations into L*u*v* system uniform color space as recommended by International Illumination Committee CIE.

$$L^*_1 = 116 \, (Y_1/Y_n)^{\wedge}(1/3) - 16 \quad (11)$$
$$(Y_1/Y_n > 0.008856)$$
$$903.29 \, (Y_1/Y_n)$$
$$(Y_1/Y_n \leq 0.008856)$$
$$u^*_1 = 13L^*_1 \, (u_1' - u_n')$$
$$v^*_1 = 13L^*_1 \, (v_1' - v_n')$$
$$u_1' = 4 X_1/(X_1 + 15 Y_1 + 3 Z_1)$$
$$v_1' = 9 Y_1/(X_1 + 15 Y_1 + 3 Z_1)$$

However, in the case where a standard light source to be used for illumination is of a C light source, with a visual field of 2 degrees, the relation will be:

$$Y_n = 100$$

$U_n' = 0.2009$ $V_n' = 0.4609$

Meanwhile, at step S5, the initial value {a′ k1} of the inverse matrix factor, the constant "a" representing the degree of non-linearity and the initial value of the inverse luminance matrix factor {b′ k1} are set, and in an inverse color correction calculation process at step S6, equations (12), (10) and (13) are sequentially calculated by using the constant "a" representing the degree of non-linearity, and the inverse color correction factor {a′ k1}, and the ink density signals (Cj,Mj,Yj) are converted into the three primary color density signals ($D_{Rj}$,$D_{Gj}$,$D_{Bj}$).

$$C'' = C^a$$
$$M'' = M^a$$
$$Y'' = Y^a \quad (12)$$

$$D_R = C''^{1/a}$$
$$D_G = M''^{1/a}$$
$$D_B = Y''^{1/a} \quad (13)$$

Further, in an inverse complementary color converting process at step S7, the three primary color density signals ($D_{Rj}$,$D_{Gj}$,$D_{Bj}$) are converted into second luminance signals (R′j, G′j, B′j) by the inverse complementary color conversion of equations (14) given below which are the inverse functions for the complementary color conversion from reflectance to the density signals.

$$R'j = 10^{-DRJ}$$
$$G'j = 10^{-DGJ}$$
$$B'j = 10^{-DBJ} \quad (14)$$

In an inverse luminance matrix calculating process at Step S8, by the inverse luminance matrix calculation of the equation (9) employing the inverse luminance matrix factor {b′k1}, the second luminance signals (R′j, G′j, B′j) are converted into the three primary color luminance signals (Rj,Gj,Bj).

At Step S9, by a color converting equation (15) of the NTSC system, the three primary color luminance signals (R,G,B) are converted into CRT output color signals (Xoj,Yoj,Zoj). It is to be noted that the known color converting equation (15) given below is intended to obtain tristimulus values to be reproduced when the three primary color luminance signals are inputted into the CRT of NTSC system.

$$\begin{bmatrix} Xoj \\ Yoj \\ Zoj \end{bmatrix} = \begin{bmatrix} 0.60699 & 0.17345 & 0.20057 \\ 0.29897 & 0.58642 & 0.11461 \\ 0.0 & 0.066075 & 1.11586 \end{bmatrix} \begin{bmatrix} Rj \\ Gj \\ Bj \end{bmatrix} \quad (15)$$

At Step S10, in the similar manner as in the equations (11), the CRT output color signals (Xoj ,Yoj, Zoj ) are converted into co-ordinates (L*oj, u*oj, v*oj) for the uniform color space, and in a color difference calculating process at step S11, color difference Euv represented by an equation (16) below is calculated by using (L*1j, u*1j, v*1j) and (L*oj, u*oj, v*oj) as obtained at Steps S4 and S10.

$$Euv = (1/n)\Sigma\{(L^*oj - L1j)^2 + (uoj - u1j)^2 + (voj - v1j)^2\}^{\frac{1}{2}} \quad (16)$$

Subsequently, at Step S12, it is checked whether or not the color difference Euv as obtained at Step S11 is minimum, and if it is not minimum, the inverse luminance matrix factor {b′ k1}, inverse matrix factor {a′ k1} and the constant "a" representing the degree of non-linearity are renewed at Step S13.

Thus, through employment of the renewed inverse luminance matrix factor, the inverse matrix factor, and the constant "a", Steps S6 to S11 are executed. Moreover, a converging calculation which repeats the above calculation loop up to the judgement that the color difference Euv is the minimum at Step S12, is executed, and when it is judged that the color difference Euv is the minimum, the process leaves the calculation loop so as to determine the inverse luminance matrix factor {b′ min k1}, the inverse matrix factor {a′ min k1}, and the constant "a" for minimizing the color difference Euv.

Ultimately, in an inverse function calculating process at Step S14, inverse matrices of the inverse luminance matrix factor {b′ min k1} and the inverse matrix factor {a′ min k1} worked out in the above step are obtained, thereby to determine the luminance matrix factor {b k1} to be used for the luminance matrix calculation, and the matrix factor {a k1}.

According to the present embodiment, as a result of the above described converging calculation executed on the color chips of about 100 colors, the color difference represented by the equation (9) was converged at Euv=4.3. Examples of the luminance matrix factor and color correction factor as obtained from the inverse luminance matrix factor and inverse color correction factor in the above case will be represented by following equations (17), (18) and (19).

$$\begin{bmatrix} b_{11} & b_{12} & b_{13} \\ b_{21} & b_{22} & b_{23} \\ b_{31} & b_{32} & b_{33} \end{bmatrix} = \begin{bmatrix} 0.896 & 0.096 & 0.008 \\ 0.002 & 0.835 & 0.163 \\ 0.068 & -0.035 & 0.967 \end{bmatrix} \quad (17)$$

$$\begin{bmatrix} a_{11} & a_{12} & a_{13} \\ a_{21} & a_{22} & a_{23} \\ a_{31} & a_{32} & a_{33} \end{bmatrix} = \begin{bmatrix} 1.443 & -0.105 & 0.037 \\ -0.360 & 1.694 & -0.032 \\ 0.002 & -0.679 & 1.978 \end{bmatrix} \quad (18)$$

$$a = 1.572 \quad (19)$$

It is to be noted here that although the color difference related to 3 stimulus values of the color signals (X1j,Y1j,Z1j) of the color chips obtained at Step S3, and the CRT output color signals (Xoj,Yoj,Zoj) obtained at Step S9, may be employed as the color difference, according to the present embodiment, the color difference related to the signals of the uniform color space widely used as the signals representing color perceived by man is adopted for the purpose.

Additionally, although the method of least squares related to the color difference Euv in the present invention is not of a linear type, it is commonly known that solution thereof may be achieved through a numerical successive solution by a non-linear mathematical programming referred to as an optimization practice, and in the present embodiment, the optimization practice based on the Fletcher & Powell method was employed.

In the foregoing, as the second embodiment of the present invention, the determining method of the correction factor has been explained.

The above embodiment is intended to determine the correction factor under the minimizing conditions related to the color difference in the uniform color space including the influence of the non-linearity present in the color reproduction using the actual ink, and by such calculation using this correction factor, the optimum correction may be made with respect to the human visual characteristics.

Subsequently, color reproducing experiments were carried out by applying the respective correction factors obtained in the determination of the correction factors as explained in the second embodiment of the present invention, to the color image forming apparatus described in the first embodiment.

In the color image forming apparatus explained with respect to the first embodiment, the deviation between the central wavelength of the spectral characteristic of the fluorescent material for the CRT and the central wavelength of the spectral absorbing characteristic of the ink is corrected by the luminance matrix calculating means, while the color turbidity during color mixing by the unnecessary absorbing component of the ink is corrected by the non-linear calculation respectively independently.

In the determination of the correction factor described with respect to the second embodiment, such correction factor is determined by the minimizing conditions related to the color difference in the uniform color space including the influence of the non-linearity.

Thus, it was possible to realize the color reproduction very faithful with respect to the color image outputted by the CRT, which is the target of the color reproduction for the video printer, and when the color difference was obtained, the color reproduction with a color difference approximately equal to that in the case of converging of the converging calculation in the second embodiment could be achieved.

Hereinbelow, another color image forming apparatus according to a third embodiment of the present invention will be described hereinafter.

In the third embodiment of the present invention, the ink density signals (C,M,Y) corresponding to discrete representative points of 32×32×32 pieces given by the high order 5 bits of each color of the three primary color luminance signals (R,G,B) of the input at 8 bit accuracy, are preliminarily stored in LUT (Look Up Table) memory, and the output for the three primary color luminance signals positioned at the intermediate points of said representative points are determined by the 8 point interpolation system which is the three dimensional linear interpolation system.

Figure 4:
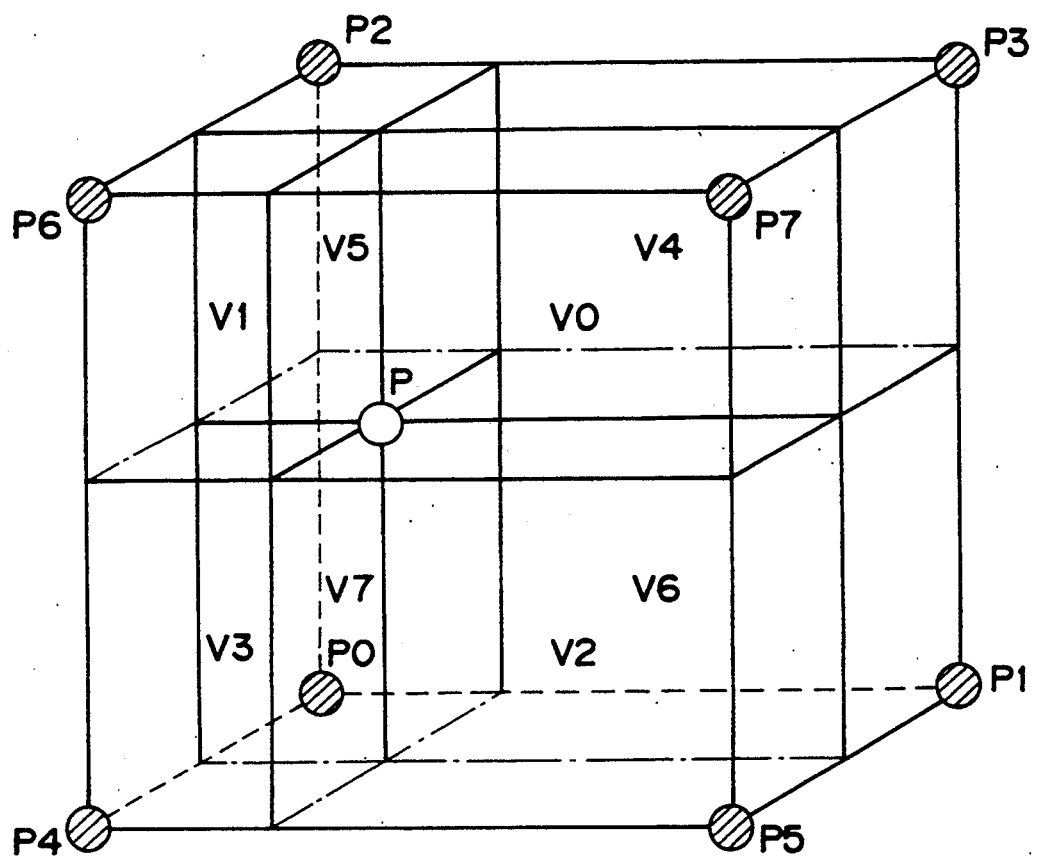
FIG. 4 is a diagram representing an interpolation method employed in the embodiment.

Before describing the constructions and functions of the third embodiment, the interpolation method referred to above will be explained through employment of FIG. 4, which shows a unit cube to be formed by eight representative points Pk (k=0~7) of the representative points for the input. With respect to the input signal P positioned at an intermediate point of the unit cube, said unit cube is divided into eight small parallelepipeds at a plane passing through said input signal P and parallel to each side of an input space, and by representing the volume of each of said small parallelepipeds as Vk(k=0~7), the volume of the unit cube as V, and the ink density signals at the representative point Pk which is in a diagonal relation with the Kth parallelepiped as (Ck,Mk,Yk), output values (C,M,Y) at the point P are calculated as in equations (20) given below.

$$C = \sum_{k=0}^{7} Ck \cdot Vk/V \qquad (20)$$

$$M = \sum_{k=0}^{7} Mk \cdot Vk/V$$

$$Y = \sum_{k=0}^{7} Yk \cdot Vk/V$$

Figure 5:
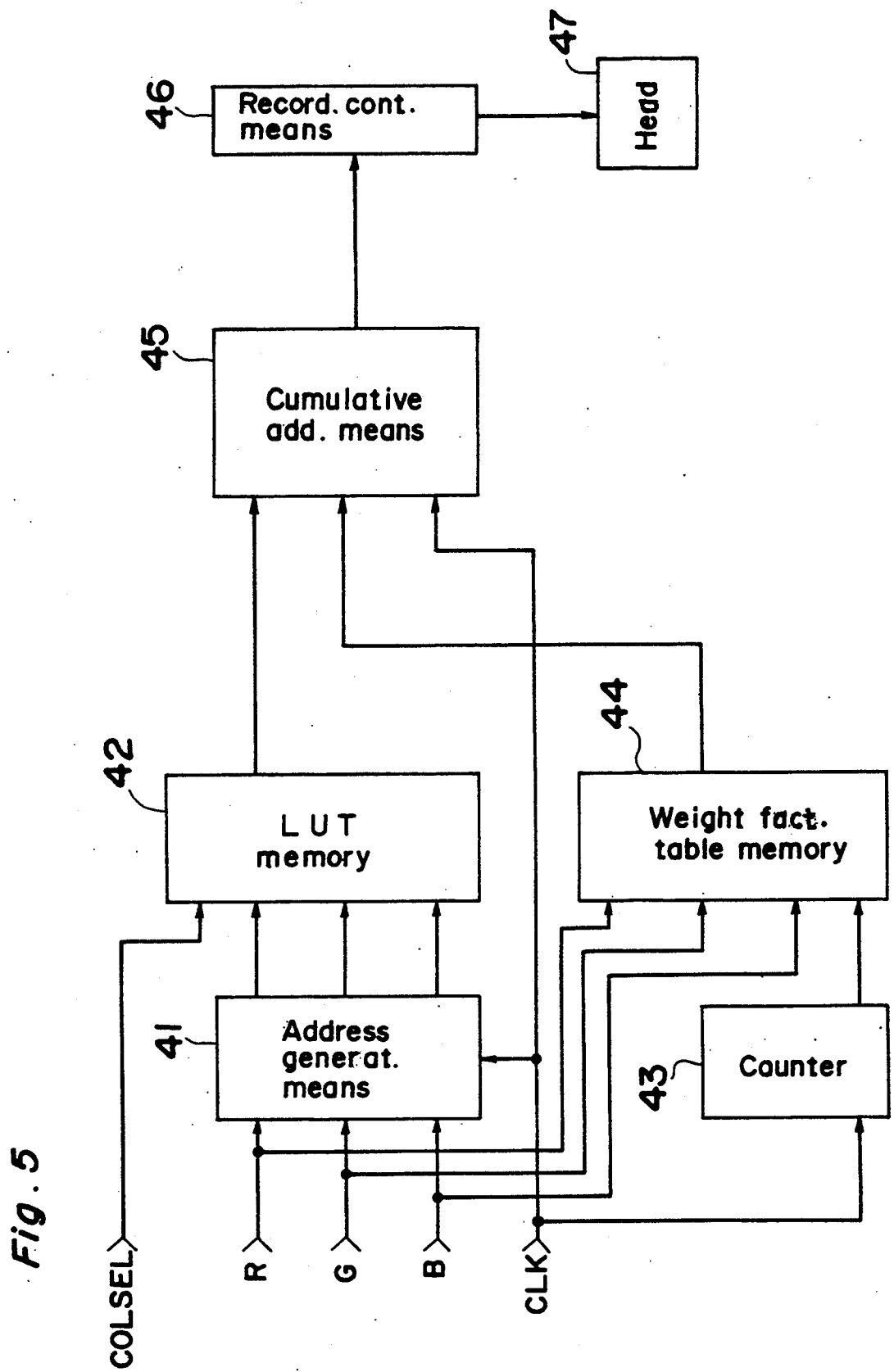
FIG. 5 is a block diagram of a color image forming apparatus showing another embodiment of the present invention.

Referring particularly to FIG. 5, there is shown a block diagram of the color image forming apparatus according to the third embodiment of the present invention, which generally includes an address generating means 41 connected to a cumulative adding means 45 through an LUT (Look Up Table) memory 42, and also coupled with a weight factor table memory 44 connected to a counter 43 and said cumulative adding means 45, which is further connected to a thermal head 47 through a recording control means 46 as illustrated.

The address generating means 41 is arranged to receive each of the higher order 3 bits of the three primary color luminance signals (R,G,B) as applied thereto so as to output the addresses of the 8 representative points of the unit cube containing the signals for (R,G,B) in synchronization with an input CLK signal.

By utilizing as addresses, the output of the address generating means 41, and COLSEL signals of 2 bits representing the color effecting the printing in yellow, magenta and cyan, the LUT memory 42 is to output the ink density signals in 8 bits corresponding to the addresses.

The counter 43 is arranged to count up in synchronization with the CLK signal for outputting 5 bits corresponding to k of the equation (20).

The weight factor table memory 44 has Vk/V in the equation (20) preliminarily stored as the weight factor, and is arranged to receive as addresses, each lower order 3 bits of the three primary colors (R,G,B) and the output of the counter 43, for outputting the weight functions corresponding to said addresses.

The cumulative adding means 45 is intended to carry out multiplication of the output of the LUT memory 42 by the output of the weight factor table memory 44, and further, to perform the cumulative addition in synchronization with the CLK signal for outputting the ink density signals (C,M,Y) to be used for the recording.

The recording control means 46 is arranged to effect the gradation color recording according to the ink density signals (C,M,Y) which are the outputs of the cumulative adding means 45 by controlling the heat amount to be impressed to the ink film (not shown).

The thermal head 47 effects the recording through control of the heat amount by the recording control means 46, and control of the ink amount to be transferred from the ink film to an image receiving paper (not shown).

Hereinafter, functioning for effecting the recording of the first color, i.e. yellow will be described.

On the assumption that the values shown by each of the higher order 5 bits of the three primary color luminance signals (R,G,B) to be reproduced are represented by (RO,GO,BO), the address generating means 41 successively outputs the addresses of (RO,GO,BO), (RO+1,GO,BO), (RO,GO+1,BO), (RO+1,GO+1,BO), (RO,GO,BO+1), (RO+1,GO,BO+1), (RO,-

GO+1,BO+1), (RO+1,GO+1,BO+1) in synchronization with the CLK signal, and the LUT memory 42 outputs Y0~Y7 to correspond to the addresses.

Meanwhile, each lower order 3 bits of the three primary color luminance signals (R,G,B) and the output of the counter 43 are inputted to the weight factor table memory 44, and the weight factors V0/V to V7/V are sequentially outputted.

Thus, the cumulative adding means 45 executes the equation (20), and the ink density signal Y for yellow corresponding to the three primary color luminance signals (R,G,B) for the inputs is outputted.

The recording control means 46 controls the heat amount of the thermal head 47 according to the value of the ink density signal Y outputted from the cumulative adding means 45 so as to effect the gradation recording on the image receiving paper (not shown).

After effecting the above functioning with respect to one image face for recording of yellow, similar function is also effected for the inks of magenta and cyan. Thus, upon completion of the recording in three colors, the desired image in full color may be formed on the image receiving paper.

So far, although the constructions and functions of the color image forming apparatus according to the third embodiment of the present invention have been described, the color correcting means which determines the ink density signals by the LUT memory and the interpolation calculation, with the three primary color density signals as the inputs, is known. In the conventional example, the ink density signals preliminarily determined by the calculation of the non-linear higher order masking, etc. with respect to the three primary color density signals at the representative points are stored in the LUT memory. On the contrary, in the third embodiment of the present invention, the three primary color luminance signals are adopted as inputs, and further, the essential point of the invention resides in the method of determining the ink density signals to be stored in the LUT memory.

Subsequently, preparation of the ink density signals (C,M,Y) corresponding to the discrete representative points of 32×32×32 pieces as stored in the LUT memory will be explained.

In the first place, with respect to the three primary color luminance signals (R,G,B) at the representative points of 32×32×32 pieces, the luminance matrix calculation of the equation (4) employing the matrix functions {b kl} (k=1~3, 1=1~3) of the equation (17) is applied for conversion into the second luminance signals (R', G', B').

Then, with respect to each color of the second luminance signals (R', G', B'), the complementary color conversion of the equation (6) is applied for conversion into the three primary color density signals ($D_R$, $D_G$, $D_B$).

With respect to the three primary color density signals ($D_R$, $D_G$, $D_B$), the first non-linear conversion of the equation (7), with the value "a" set as in the equation (19) is applied for conversion into (C', M', Y').

Thereafter, with respect to the signals (C', M', Y') thus obtained, the linear matrix calculation of the equation (5), employing the matrix factors {a kl} (k=1~3, 1=1~3) of the equation (18) is applied for conversion into signals (C'',M'',Y'').

By applying the second non-linear conversion of the equation (8), with the value "a" set as in the equation (19), to (C'',M'',Y''), the ink density signals (C,M,Y) to be stored in the LUT was obtained.

It should be noted here that the above calculation were carried out based on the floating point calculations through employment of a computer, and when the ink density signals (C,M,Y) to be stored in the LUT memory 42 are determined, conversion into the integral number at the accuracy of 8 bits was effected.

According to the above embodiment, through employment of the construction including the LUT memory and the interpolation circuit, the luminance matrix calculation, complementary color conversion, and color correcting calculation can be realized by the circuit construction on a small scale as compared with the arrangements where the above circuits are respectively constructed by hardwares.

Subsequently, a fourth embodiment related to the color image forming apparatus of the present invention will described.

In the fourth embodiment in which the present invention is applied to a video printer, the point in which the ink density signals with respect to the input are determined by the LUT memory and the interpolation circuit is similar to that in the third embodiment, and it is to be noted that as compared with the third embodiment, this fourth embodiment employs the γ-corrected luminance signal of the CRT as the input, and further, the essential point of the invention resides in the method of determining the ink density signals to be stored in the LUT memory.

Hereinbelow, preparation of the ink density signals (C,M,Y) data corresponding to the representative points as stored in the LUT memory, which is the essential factor of the present invention, will be described.

Firstly, with respect to the representative points of 32×32×32 pieces for the y-corrected luminance signals (R'',G'',B'') of the cathode ray tube, CRT inverse γ-corrected of equations (21) employing a constant 2.2 for each color is applied, for conversion into linear three primary color luminance signals (R,G,B) not applied with γ of the cathode ray tube.

$R = R''^{2.2}$ $G = G''^{2.2}$ $B = B''^{2.2}$ (21)

With respect to the linear three primary color luminance signals (R,G,B), the luminance matrix calculation of the equation (4) employing the matrix factors {b kl} (k=1~3, 1=1~3) for the equation (17) is applied, for conversion into the second luminance signals (R', G', B').

Then, to each color of said second luminance signals (R', G', B'), the complementary color conversion of the equation (6) is applied for conversion into the three primary color density signals ($D_R$,$D_G$, and $D_B$).

With respect to the three primary color density signals ($D_R$, $D_G$, $D_B$), the first non-linear conversion of the equation (7), with the value "a" set as in the equation (19) is applied for conversion into (C', M', Y').

Thereafter, with respect to the signals (C', M', Y') thus obtained, the linear matrix calculation of the equation (5) employing the matrix factors {a kl} (k=1~3, 1=1~3) of the equation (18) is applied for conversion into signals (C'',M'',Y'').

By applying the second non-linear conversion of the equation (8), with the value "a" set as in the equation

(19) to (C″,M″,Y″), the ink density signals (C,M,Y) to be stored in the LUT was obtained.

It should be noted here that the above calculations were effected by the floating point calculations through employment of a computer in the similar manner as in the third embodiment, and conversion was made into the integral number at the accuracy of 8 bits when the ink density signals (C,M,Y) to be actually stored in the LUT memory were determined.

Here, the difference between the case where the input signals are of the linear three primary color luminance signals and the case where they are of the γ-corrected luminance signals of CRT, will be described.

Figure 6:
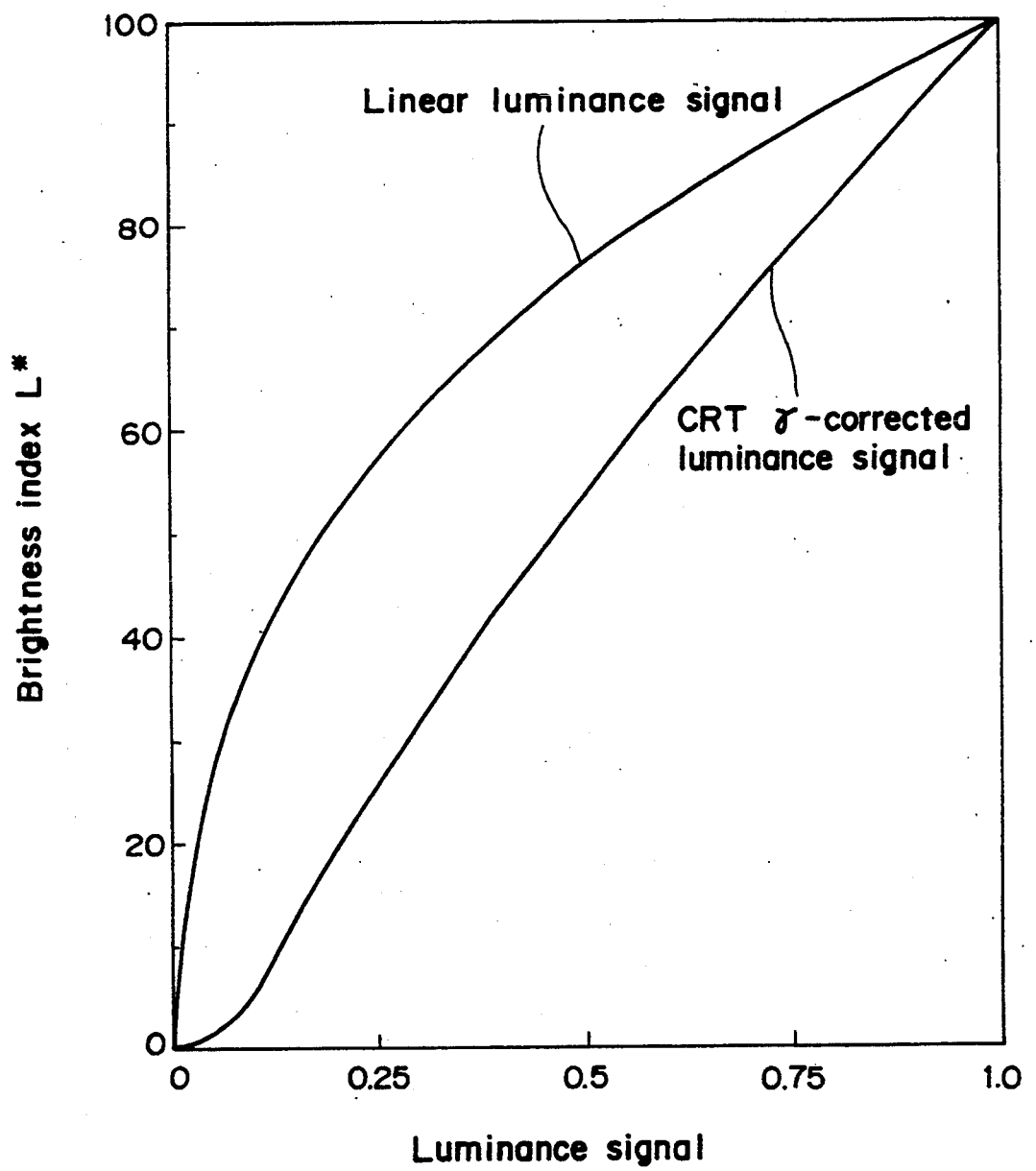
FIG. 6 is a graphical diagram showing relation between luminance signal and brightness index L*.
Figure 8:
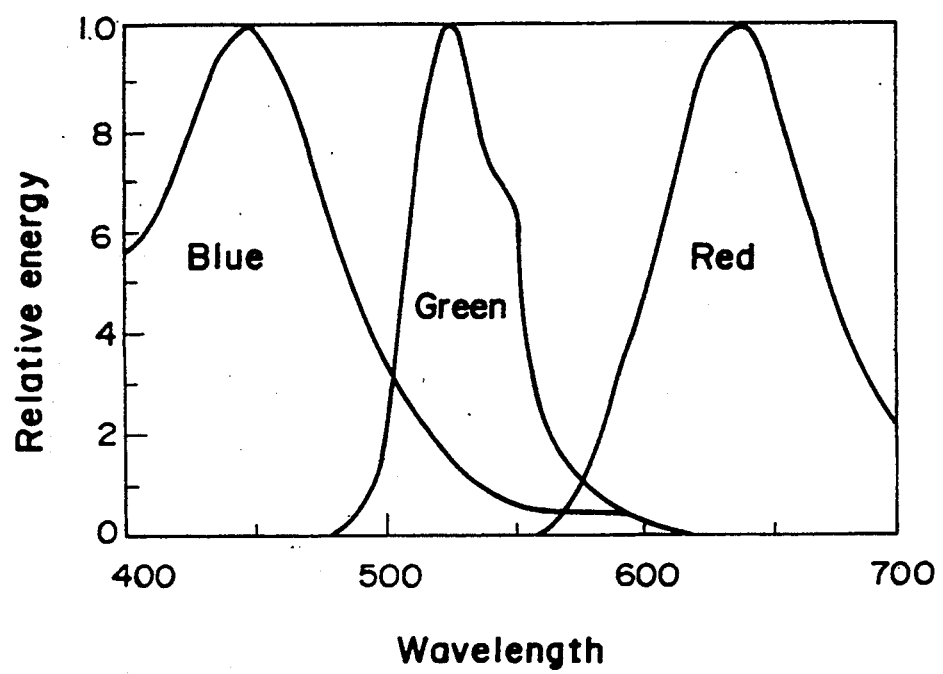
FIG. 8 is a diagram showing spectral characteristics of a fluorescent material for a typical cathode ray tube (CRT) (already referred to)
Figure 9:
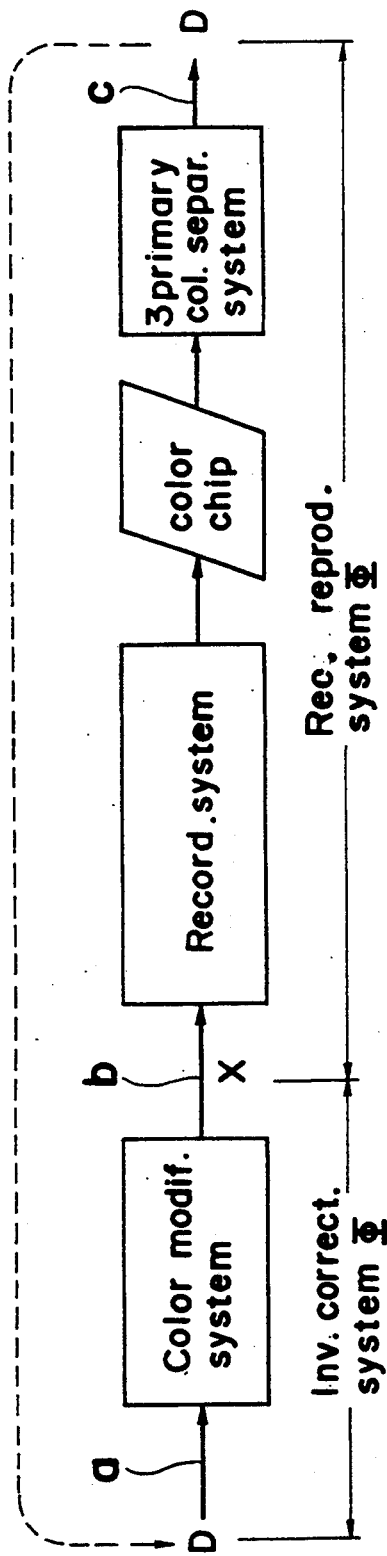
FIG. 9 is a block diagram showing a conventional method of determining color correction factors (already referred to).

Variations of brightness index L* for the uniform color space with respect to the linear three primary color luminance signals and the grey scale of the γ-corrected luminance signals of the CRT (signals of R=G=B or R″=G″=B″) were studied by calculations, the results of which are shown in FIG. 6. From FIG. 6, it will be seen that, as compared with the linear luminance signals, the γ-corrected luminance signals of the CRT are in a more linear relation with respect to the brightness perceived by man.

In the present embodiment, through employment of the γ-corrected luminance signals of CRT as the input, deterioration of accuracy by the interpolation may be alleviated, and particularly, the gradation reproducing characteristic with respect to the input signals of low brightness has been markedly improved.

In the foregoing description, the embodiments related to the color image forming apparatus applied with the correction factor determining method and the color image forming method according to the present invention have been explained.

In the embodiment related to the color image forming apparatus, the present invention has been explained with respect to the example as applied to the video printer, with the luminance matrix calculation being arranged to correct the deviation between the central wavelength of the spectral characteristic of the fluorescent material of the CRT and the central wavelength of the spectral absorbing characteristic of the ink. However, for application to a color copying apparatus, it is to be so arranged to correct the deviation between the central wavelength of the spectral transmitting characteristic of a color separating filter to be used in a color scanner for subjecting a color original to the color separation, and the central wavelength of the spectral absorbing characteristic of the ink. In that case, for the determination of the correction factor of the present invention, instead of the color converting equation (8) of NTSC (National Television System Committee), the inverse function of the converting equation for converting the color signals (Xo,Yo,Zo) into the three primary color luminance signals (R,G,B) when the color scanner reads the original document, may be employed.

Meanwhile, in the embodiment related to the color image forming apparatus, the present invention has been described with reference to the example as applied to the printer of the subliming type thermal transfer recording system, it is clear that the difference in the recording principle of the printer is irrelevant to the present invention.

Furthermore, in the third and fourth embodiments, although the data to be stored in the LUT memory is set to be the ink density signals, it may be so arranged to preliminarily obtain the relation referred to as γ-characteristic of the ink sheet between the ink density and the pulse width to apply voltage to the thermal head, and to store the pulse width data for reproduction of the desired ink density in the LUT memory.

As is clear from the foregoing description, according to the color image forming method of the present invention, the color turbidity due to the unnecessary absorbing component of the ink is corrected by the non-linear function and the linear matrix calculation, while the deviation between the target color and hue resulting from the deviation in the central wavelengths of the spectral absorbing characteristic of the ink is corrected by the luminance matrix calculation in the luminance signal respectively independently, and therefore, it becomes possible to effect correction at high accuracy as compared with the arrangement in which the corrections for the both are effected only by the color correcting calculation by the density signal as in the conventional linear masking.

Moreover, according to the correction factor determining method of the present invention, since the luminance matrix factor to be used for the luminance matrix calculation and the color correction factor to be employed for the color correcting calculation may be determined to minimize the color difference perceived by man, it becomes possible to effect the correction at high accuracy from the viewpoint of human visual characteristics by employing the correction factor as determined by the present method.

Furthermore, in the color image forming apparatus applied with the present invention, and employing the circuit construction using the LUT memory and the interpolation circuit, similar effects are available by the circuit construction on a smaller scale, as compared with the structure in which the luminance matrix calculation, complementary color conversion and color correcting calculation are respectively constructed by hardwares.

Additionally, in the case where the input is set to be of the γ-corrected luminance signal of the CRT in the circuit construction employing the LUT memory and interpolation circuit, owing to the fact that the input signal of the LUT memory and the brightness index corresponding to the brightness perceived by man are in the relation close to the linear shape, the gradation reproducibility particularly with respect to the input signal at low brightness may be markedly improved.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A method of forming a color image which comprises the steps of:
   a) subjecting three primary color luminance signals (R,G,B) of additive color mixture to matrix conversion into second luminance signals (R', G', B')
   b) subjecting each color of said second luminance signals (R', G', B') to complementary color conversion into three primary color density signals ($D_R$, $D_G$, $D_B$) of subtractive color mixture,
   c) subjecting each color of said three primary color density signals ($D_R$, $D_G$, $D_B$) to non-linear conversion into signals (C', M', Y') by first non-linear function of monotone increase, with derivative thereof being also of monotone increase, d) converting the signals (C', M', Y') into signals (C",M",Y") by linear matrix calculation, and e) further subjecting said signals (C",M",Y") to non-linear conversion into ink density signals (C,M,Y) to be used for recording by second non-linear function of monotone increase, with derivative thereof being of monotone decrease, which is of an inverse function of said first non-linear function, wherein steps a) through e) are performed sequentially, whereby the ink density is controlled according to said ink density signals (C,M,Y) for effecting color recording.

2. A color image forming apparatus which comprises:

a luminance matrix means for converting three primary color luminance signals (R,G,B) of additive color luminance signals, into second luminance signals (R', G', B') through matrix conversion, a complementary color converting means, coupled in series with the luminance matrix means, for converting each color of said second luminance signals (R', G', B') into three primary color density signals ($D_R$, $D_G$, $D_B$) of subtractive color mixture, a first converting means, coupled in series with the complementary color converting means, for said three primary color density signals ($D_R$, $D_G$, $D_B$) to non-linear conversion by first non-linear function of monotone increase, with derivative thereof being also of monotone increase, a matrix means, coupled in series with the first converting means, for effecting matrix calculation by receiving outputs (C', M', Y') of said first converting means as inputs so as to output signals (C"M"Y") and a second converting means, coupled in series with the matrix means, for subjecting said signals (C",M",Y") to non-linear conversion into ink density signals (C,M,Y) by second non-linear function of monotone increase, with derivative thereof being of monotone decrease, which is of an inverse function of said first non-linear function, whereby the ink density is controlled according to said ink density signals (C,M,Y) for effecting said color recording.

3. A color image forming apparatus which comprises:

a memory means including ROM or RAM for storing ink density signals (C,M,Y) obtained by a) subjecting three primary color luminance signals (R,G,B) of additive color mixture to matrix conversion by luminance matrix calculation into second luminance signals (R'G'B') and b) subjecting each color of said second luminance signals (R', G', B') to complementary color conversion into three primary color density signals ($D_R$, $D_G$, $D_B$) of subtractive color mixture, and c) subjecting each color of said three primary color density signals ($D_R$, $D_G$, $D_B$) to non-linear conversion into signals (C', M', Y') by first non-linear function of monotone increase, with derivative thereof being also of monotone increase, and d) converting the signals (C', M', Y') into signals (C",M",Y") by matrix calculation, and e) further subjecting said signals (C",M",Y") to non-linear conversion by second non-linear function of monotone increase, with derivative thereof being of monotone increase, which is of an inverse function of said first non-linear function, wherein steps a) through e) are performed sequentially, an address generating means which inputs each higher order bit of the three primary color luminance signals (R,G,B) for generating address to be applied to said memory means, and an interpolation calculating means which performs interpolation calculation through employment of the ink control signal outputted from said memory means, and each lower order bit information of said three primary color luminance signals (R,G,B) to be recorded, thereby to determine ink density signals (C,M,Y) with respect to said three primary color luminance signals (R,G,B) to be recorded, whereby the color recording is effected according to said ink density signals (C,M,Y).

4. A color image forming apparatus which comprises:

a memory means including ROM or RAM for storing ink density signals (C,M,Y) obtained by a) converting each color of γ-corrected luminance signals (R",G",B") of CRT into three primary color luminance signals (R,G,B) by a CRT inverse γ correcting calculating step, and b) converting said three primary color luminance signals (R,G,B) into second luminance signals (R', G', B') by a luminance matrix calculation, and c) converting each color of said second luminance signals (R', G', B') into three primary color density signals ($D_R$, $D_G$, $D_B$) of subtractive color mixture by a complementary color conversion, and d) subjecting each color of said three primary color density signals ($D_R$, $D_G$, $D_B$) to non-linear conversion into signals (C', M', Y') by first non-linear function of monotone increase, with derivative thereof being also of monotone increase, and e) converting the signals (C', M', Y') into signals (C",M",Y") by matrix calculation, and further subjecting said signals (C",M",Y") to non-linear conversion by second non-linear function of monotone increase, with derivative thereof being of monotone decrease, which is of an inverse function of said first non-linear function, wherein steps a) through e) are performed sequentially, an address generating means which inputs each higher order bit of the γ-corrected luminance signals (R",G",B") to be recorded for generating address to be applied to said memory means, and an interpolation calculating means which performs interpolation calculation through employment of the ink density signals outputted from said memory means, and each lower order bit information of said CRT γ-corrected luminance signals (R",G",B") to be recorded, thereby to determine ink density signals (C,M,Y) with respect to said CRT γ-corrected luminance signals (R", G", B") to be recorded, whereby the color recording is effected according to said ink density signals (C,M,Y).

5. A method of determining correction factor including a luminance matrix factor to be employed in a luminance matrix calculation for converting three primary color luminance signals (R,G,B) into second luminance signals (R', G', B'), and a color correction factor to be employed in a color correcting calculation for converting three primary color density signals ($D_R$, $D_G$, $D_B$)

into ink density signals (C,M,Y) to be used for recording, said method comprising:

- a color chip signal generating step for generating n sets of ink density signals (Cj,Mj,Yj) (where j=1−n, n is a natural number),
- a color chip forming step for forming n sets of color chips by controlling ink density through employment of said ink density signals (Cj,Mj,Yj),
- a color measuring step for measuring color of said color chips,
- an inverse color correcting calculating step for converting the ink density signals (Cj,Mj,Yj) into the three primary color density signals ($D_{Rj}, D_{Gj}, D_{Bj}$) by an inverse color correcting calculation which is an inverse function of said color correcting calculation,
- an inverse complementary color converting step for effecting the inverse complementary color conversion with respect to each color of said three primary color density signals ($D_{Rj}, D_{Gj}, D_{Bj}$) for conversion into second luminance signals (R'j, G'j, B'j),
- an inverse luminance matrix calculating step for converting said second luminance signals (R'j, G'j, B'j) into the three primary color luminance signals (Rj,Gj,Bj) by inverse luminance matrix calculation which is an inverse function of said luminance matrix calculation,
- an evaluation value calculating step for calculating evaluation value through employment of the color measuring result of the color chips obtained by said color measuring step and the three primary color luminance signals (Rj,Gj,Bj) obtained by said inverse luminance matrix calculating step,
- a converging calculation step which judges whether or not the evaluation value which is the output of said evaluation calculating step is the minimum, and effects renewal of the inverse color correction factor to be used for the inverse color correcting calculating and the inverse matrix factor to be used for the inverse matrix calculation according to the result of said judgement, thereby to output the inverse color correction factor and the inverse luminance matrix factor for minimizing said evaluation value, and
- an inverse function calculating step for calculating the color correction fact or and luminance matrix factor by calculating inverse functions of the inverse color correction factor for minimizing said evaluation value, the inverse color correcting calculation employing the inverse luminance matrix factor, and the inverse luminance matrix calculating respectively.

* * * * *

UNITED STATES PATENT AND TRADEMARK OFFICE
CERTIFICATE OF CORRECTION

PATENT NO.   : 5,422,738
DATED        : June 6, 1995
INVENTOR(S)  : Ishihara et al.

It is certified that error appears in the above-identified patent and that said Letters Patent is hereby corrected as shown below:

Column 18, line 61, after "(R', G', B')" insert a comma --,--.

Column 20, line 1, delete "increase" and insert therefor --decrease--.

Column 22, line 21, "Fact or" should read --Factor--.

Signed and Sealed this

Twenty-third Day of January, 1996

Attest:

BRUCE LEHMAN

Attesting Officer    Commissioner of Patents and Trademarks